(12) United States Patent
Toyoda

(10) Patent No.: US 7,471,672 B2
(45) Date of Patent: Dec. 30, 2008

(54) IP TELEPHONE AND IP TELEPHONE CALL METHOD

(75) Inventor: Kiyoshi Toyoda, Kunitachi (JP)

(73) Assignee: Panasonic Corporation, Osaka (JP)

( * ) Notice: Subject to any disclaimer, the term of this patent is extended or adjusted under 35 U.S.C. 154(b) by 995 days.

(21) Appl. No.: 10/915,359

(22) Filed: Aug. 11, 2004

(65) Prior Publication Data

US 2005/0220082 A1 Oct. 6, 2005

(30) Foreign Application Priority Data

Mar. 30, 2004 (JP) ............... 2004-100198

(51) Int. Cl.
*H04N 1/00* (2006.01)

(52) U.S. Cl. .................. 370/352; 358/402; 709/230

(58) Field of Classification Search .............. 370/352
See application file for complete search history.

(56) References Cited

U.S. PATENT DOCUMENTS

| | | | |
|---|---|---|---|
| 5,946,386 A * | 8/1999 | Rogers et al. | 379/265.09 |
| 6,614,891 B2 | 9/2003 | Toyoda et al. | |
| 7,136,475 B1 * | 11/2006 | Rogers et al. | 379/213.01 |
| 2004/0057568 A1 * | 3/2004 | Kawabata et al. | 379/220.01 |
| 2004/0199649 A1 * | 10/2004 | Tarnanen et al. | 709/230 |
| 2005/0117183 A1 * | 6/2005 | Adlakha et al. | 358/402 |
| 2006/0209333 A1 * | 9/2006 | Takida | 358/1.15 |
| 2006/0242242 A1 * | 10/2006 | Ezumi et al. | 709/206 |

FOREIGN PATENT DOCUMENTS

| | | |
|---|---|---|
| CN | 1419368 | 5/2003 |
| KR | 10-2004-0023961 | 3/2004 |

OTHER PUBLICATIONS

English language Abstract of Korean 10-2004-0023961. Oct. 2004.

* cited by examiner

*Primary Examiner*—Creighton H Smith
(74) *Attorney, Agent, or Firm*—Greenblum & Bernstein, P.L.C.

(57) ABSTRACT

An IFAX IP telephone connects a call to an opposing IFAX IP telephone via the Internet, and executes a voice call process that exchanges voice packets with the connected opposing IFAX IP telephone. When transmitting an image data to the opposing IFAX IP telephone during the voice call to the same telephone, an IFAX packet is generated, the packet having the opposing IFAX IP telephone as the destination. The IFAX packet is transmitted, while prioritizing the voice packet transmission.

11 Claims, 8 Drawing Sheets

$ORIGIN <telephone number converted into a domain form>
                            30

IN NAPTR <Priority number1><Priority number2>"u""E2U+<type>:<subtype>""!^.*$!<URI Scheme>:<URI>!"
  31       32                33              34    35      36       37  38      39          40

Fig.4

$ORIGIN 8.7.6.5.4.3.1.8.e164.arpa
    IN NAPTR 10 100 "u" "E2U+sip"         "!^.*$!sip:iptel@ifax2.abc.com!
    IN NAPTR 10 101 "u" "E2U+ifax:mailto"   !^.*$!mailto:toyo@abc.com!"
    IN NAPTR 10 102 "u" "E2U+http"        "!^.*$!http:pfile@ifax2.abc.com!"
    IN NAPTR 10 103 "u" "E2U+mail"        "!^.*$!mailto:toyo@abc.com!"

IP TELEPHONE AND IP TELEPHONE CALL METHOD

BACKGROUND OF THE INVENTION

1. Field of the Invention

The present invention relates to an IP telephone and an IP telephone call method that enable a voice call over the Internet.

2. Description of Related Art

In recent years, various forms of IP telephone services that employ the VoIP (Voice over Internet Protocol) technology are provided. As an example of the IP telephone services, an SIP server on an IP network connects a call, according to the SIP (Session Initiation Protocol), between an IP telephone at a caller terminal and an IP telephone at a receiver terminal. After the call is connected, the IP telephones exchanges voice packets via the IP network, in order to realize the real-time telephone call.

In addition, as a technology for communicating image information via the IP network between different terminals, an Internet facsimile (IFAX) has been introduced. For such an IFAX service, the IETF (Internet Engineering Task Force) has made some recommendations on details of the data format (IFAX data format) to be exchanged over the IP network (RFC2305). For example, a document is scanned at an IFAX terminal, converted into a TIFF format, and further converted into e-mail data in the MIME format before transmitted to a mail server of the destination IFAX terminal. Then, the destination IFAX terminal (receiver terminal) receives the data from the mail server (POP server) (see Related Art 1, for example).

[Related Art 1] Specification of U.S. Pat. No. 6,614,891

When an IP telephone with the IFAX function (telephone having both IFAX and IP telephone functions) has a voice call to another IP telephone with the IFAX function, the voice call must be terminated in order to transmit a document image to the call receiver. When the transmission of the image information (with the IFAX function) is finished, the caller must make another IP telephone call to the same party for continuing the voice call.

SUMMARY OF THE INVENTION

The present invention address the above-described problem. The purpose of the present invention is to provide an IP telephone and an IP telephone call method that are capable of transmitting image information, file data, and the like, to a receiver during a voice call without terminating the call, after the voice call is connected to the receiver.

The IP telephone call method according to the present invention includes a step of connecting a call to an IP telephone (receiver) via the IP network, a step of executing a call process in which voice packets are exchanged between the connected IP telephones, and a step of generating an image information packet to be transmitted to the receiver IP telephone as the destination, when transmitting an image to the IP telephone during the voice call to the IP telephone, and transmitting the image information packet to the IP network while prioritizing the transmission of the voice packets for the voice call.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

Embodiments of an IP telephone having an IFAX function according to the present invention are explained in the following, in reference to the above-described drawings.

First Embodiment

Figure 1:
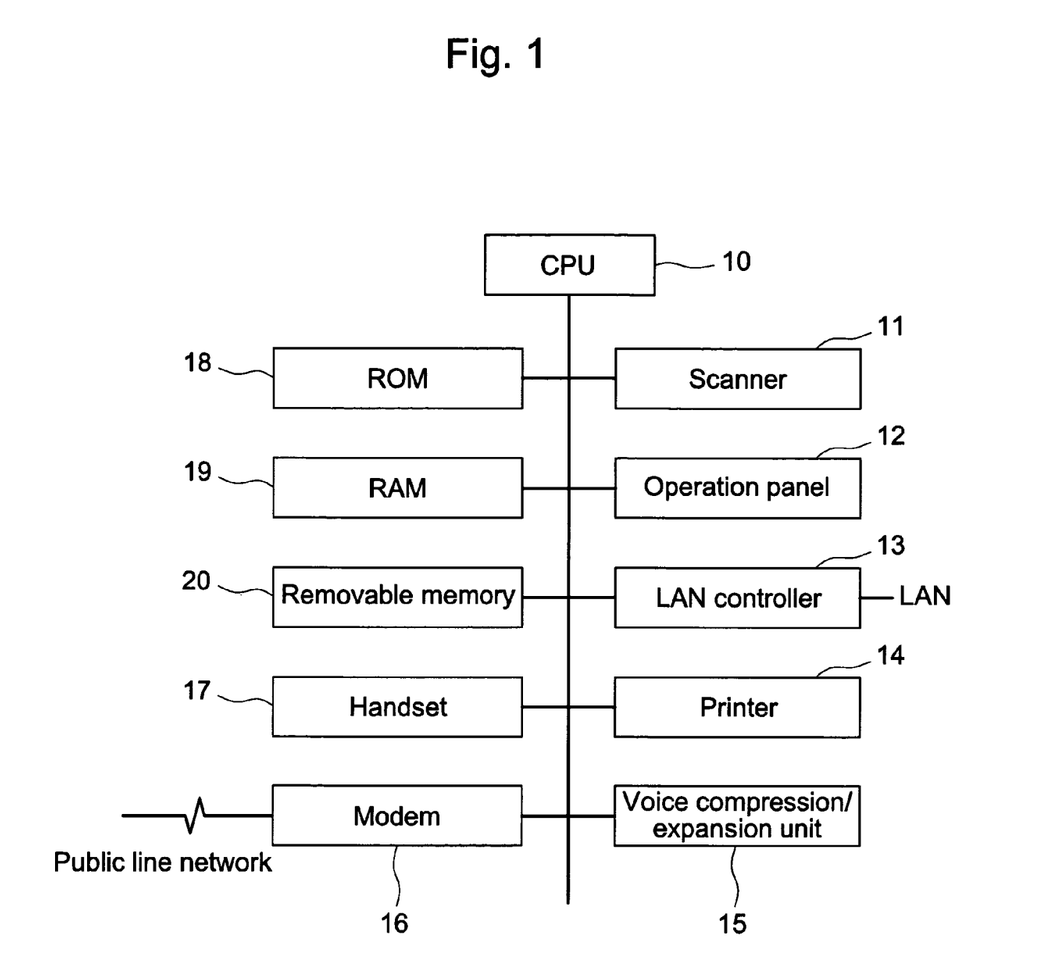
FIG. 1 is a block diagram illustrating an IP telephone having an IFAX function according to an embodiment of the present invention.

FIG. 1 is a functional block diagram illustrating the IP telephone having the IFAX function (hereafter referred to as IFAX IP telephone) according to the embodiment of the present invention. As shown in FIG. 1, the IFAX IP telephone has a configuration that enables voice calls via the Internet using the IP telephone function, as well as image communication via the Internet using the IFAX function.

Within the IFAX IP telephone, units such as scanner 11, operation panel 12, LAN controller 13, printer 14, voice compression/expansion unit 15, modem 16, and handset 17 are connected to CPU 10 via a bus. In addition, the IFAX IP telephone further includes memory media such as ROM 18, RAM 19, and removable memory 20.

Scanner 11 is a unit that scans a document and captures the image in an electronic data format. Operational panel 12 is a unit that includes a display and operation buttons, one of which is a start button that gives a command for starting functions such as scanner function, IFAX function, and copy function. In addition, soft buttons displayed on the display can also function as operation buttons. LAN controller 13 has an interface function that interfaces and exchanges data with the LAN, by physically connected to LAN. Data being transmitted/received by the IFAX IP telephone via the Internet is transmitted to the Internet or retrieved from the Internet by LAN controller 13. Printer 14 is a unit that prints out printed data, the data being output from a print command of CPU 10. The copy function is performed by capturing an image at scanner 14 and outputting a printout at printer 14. Printer 14 also performs one of IFAX functions, that is, to output a received image as a printout. Voice compression/expansion unit 15 includes a DSP (Digital Signal Compressor) that expands voice data (compressed data) retrieved from LAN controller 13. Modem 16 is a unit that transmits and receives signals to/from the public phone line. Handset 17 includes a speaker and a microphone. The apparatus also includes an off-hook/on-hook detection circuit that detects whether handset 17 is in the off-hook/on-hook status and notifies the detection result to CPU 10 (not shown in the figures). ROM 18 stores application programs for IFAX IP telephone functions, including the IP telephone function, IFAX function, scanner function, and copy function. In particular, in order to execute each above-described function, CPU 10 executes a command for a program read from ROM 18, and controls the operation of each unit. RAM 19 is a work area for CPU 10 to execute each process. Removal memory 20 includes memory media such as CD, FD(R), etc.

Figure 2:
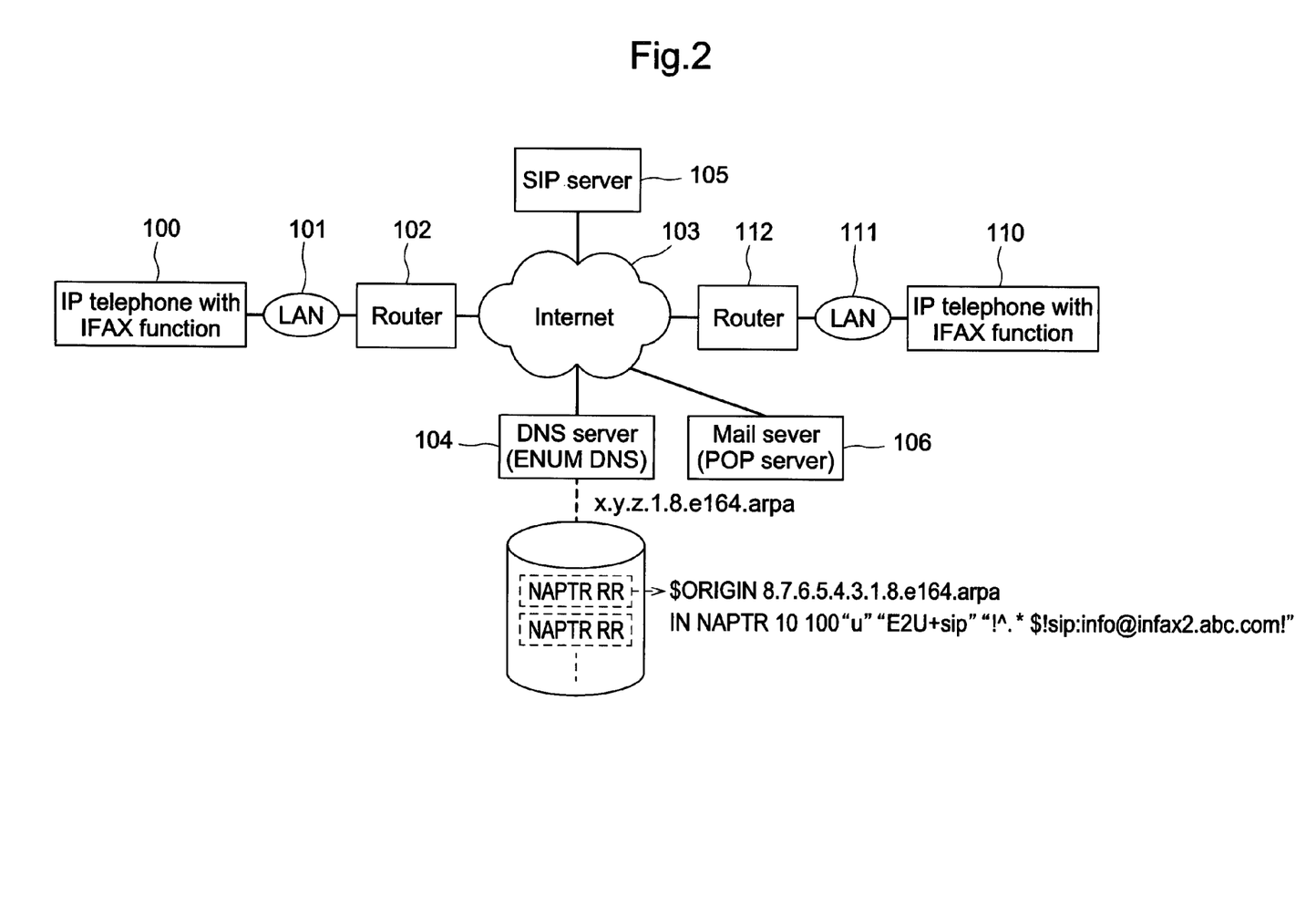
FIG. 2 illustrates a network configuration to which the IP telephone having the IFAX function of FIG. 1 is applied.

FIG. 2 illustrates a network configuration to which the IFAX IP telephone is applied. IFAX IP telephone 100 (110) is connected to LAN 101 (111) to enable an access to Internet 103 via LAN 101 (110) and router 102 (112).

DNS server 104, SIP server 105, and mail server 106 are provided on Internet 103. DNS server 104 functions as an ENUM (Telephone Number Mapping) DNS that employs the ENUM protocol associating a telephone number with a resource on the Internet.

SIP server 105 is a server that assists processes such as establishing a session on the network, according to SIP (Session Initiation Protocol). In this embodiment, SIP server 105 connects a call between the caller terminal and the receiver terminal.

Mail server 106 has a POP server configuration. For example, mail server 106 includes a mailbox of IFAX IP telephone 110 that receives, via the Internet, e-mail having the e-mail address of IFAX IP telephone 110 in the "to" field, and stores the e-mail. Upon receiving a reception request from IFAX IP telephone 110, the e-mail stored in the mail box is downloaded to the IFAX IP telephone 110.

The following briefly explains a system in which a telephone number is converted into a URI at DNS server 104.

The ENUM searches for a DNS using a telephone number as a key, based on the E.164 recommendation (international agreement for telephone numbers by ITU-T). The ENUM provides a system in which one or more available applications, corresponding to the E.164 number, are obtained in the URI (Uniform Resource Identifier) format.

ENUM DNS stores data for each telephone number that is converted and attached to a domain (hereafter referred to as domain-form telephone number). Data is stored as a type of a resource record (RR) called NAPTR (Naming Authority Pointer) (hereafter referred to as NAPTR resource record).

One or more NAPTR resource records can be registered for a domain-form telephone number. Therefore, when searching for an ENUM DNS using the domain-form telephone number, it is possible to receive a plurality of NAPTR resource records.

Figure 3:
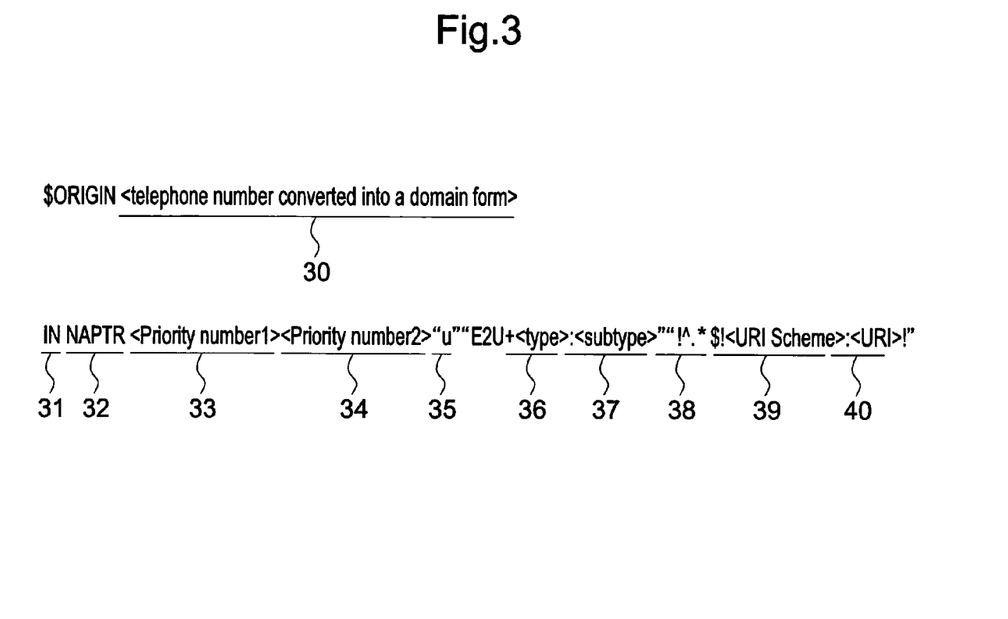
FIG. 3 illustrates a configuration of a converted telephone number to which a domain is attached.

FIG. 3 illustrates a configuration of the NAPTR resource record. In the figure, a telephone number of the terminal is converted into a domain-form number (30) according to a predetermined rule. In particular, the telephone number is reversed in order, and dots "." are inserted after each numeral. At the end of the reversed number, "e164.arpa", which is a domain name of ENUM DNS (104), is added. In the next line of the domain-form telephone number (30), class (31), resource record type (32), priority degree among NAPTR resource records (33, 34), flag (35), service contents (36, 37), regular expression (38), URI scheme (39), and URI (40). URI (40) illustrates address information in case the terminal having the telephone number (30) uses the service described in the service contents (36, 37). In other words, the NAPTR resource record can specify the kind of service by the service contents (36, 37), and URI (40) can specify the address when the service is used. ENUM DNS (104) can register a plurality of NAPTR resource records in association with the domain-form telephone number (30) of its own.

Figure 4:
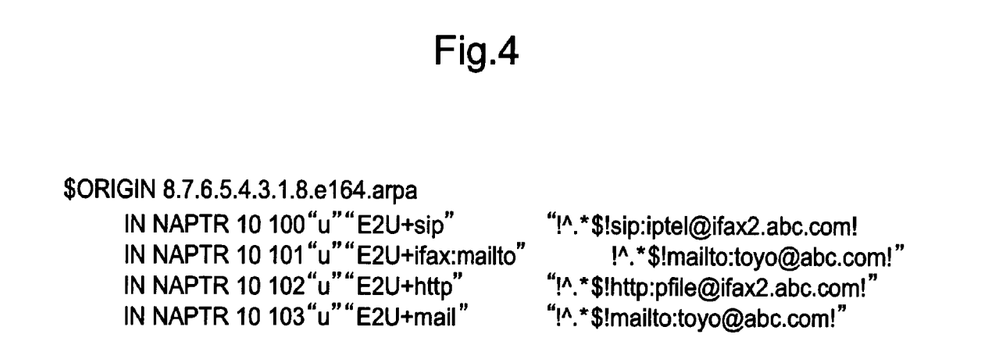
FIG. 4 illustrates an example of an NAPTR resource code.

FIG. 4 illustrates an example of registering four NAPTR resource records in association with the telephone number "81-03-5434-5678". An IP telephone service is assigned to the first NAPTR resource record, an IFAX service to the second, a file transport service to the third, and a mail service to the fourth.

The following illustrates an operation in which IFAX communication to a receiver is performed while maintaining an IP telephone voice call to the same receiver, according to the above-described embodiment of the present invention.

IFAX IP telephone 100 (110) transmits compressed voice data in a voice packet to the network. The voice packet is transported using the UDP (User Datagram Protocol: transport layer, connectionless model protocol) and the RTP (Real-time Transport Protocol: supporting transport of real-time data).

Figure 5:
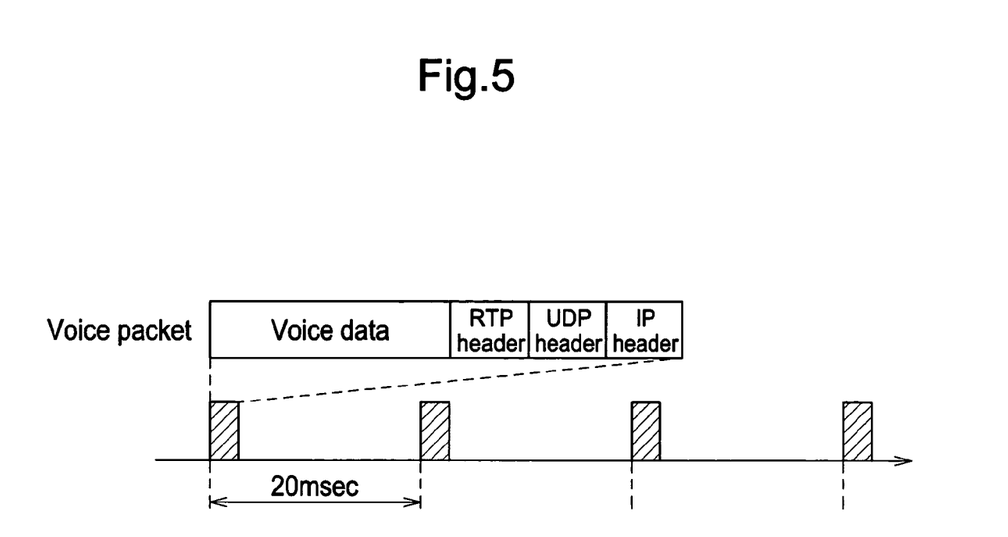
FIG. 5 illustrates a configuration of a voice packet and its transmission timing.

As shown in FIG. 5, CPU 10 prioritizes the voice packet transport, by inserting a task interruption every predetermined time period (e.g. every 20 msec). When the receiver terminal, to which the call is established via SIP server 105 (e.g., IFAX IP telephone 100), and the caller terminal (e.g., IFAX IP telephone 110) prioritize the voice packet transport as shown in FIG. 5, a real-time voice call can be achieved between the caller and receiver terminals.

Figure 6:
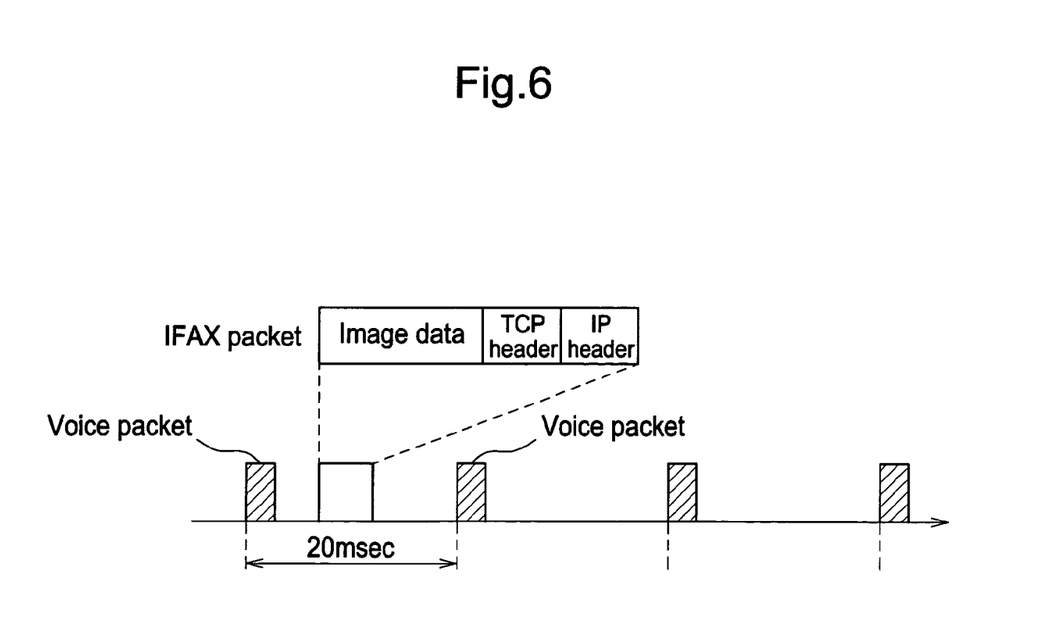
FIG. 6 illustrates a configuration of an IFAX packet and its transmission timing.

During such a voice call, image data is transported to the receiver using the IFAX service. In particular, image data compressed for the IFAX service is transmitted as a packet (hereafter referred to as IFAX packet). The IFAX packet is transported using TCP (Transmission Control Protocol: transport layer, connection model protocol). As shown in FIG. 6, since the voice packet transmission is prioritized every predetermined time period, the IFAX packet is transmitted using a gap between two consecutive voice packets (absent period of voice packets). In other words, the IFAX data is transmitted to the same receiver, during an IP telephone voice call, by transmitting one or more IFAX packets between a previous voice packet transmission and the next task interruption.

Figure 7:
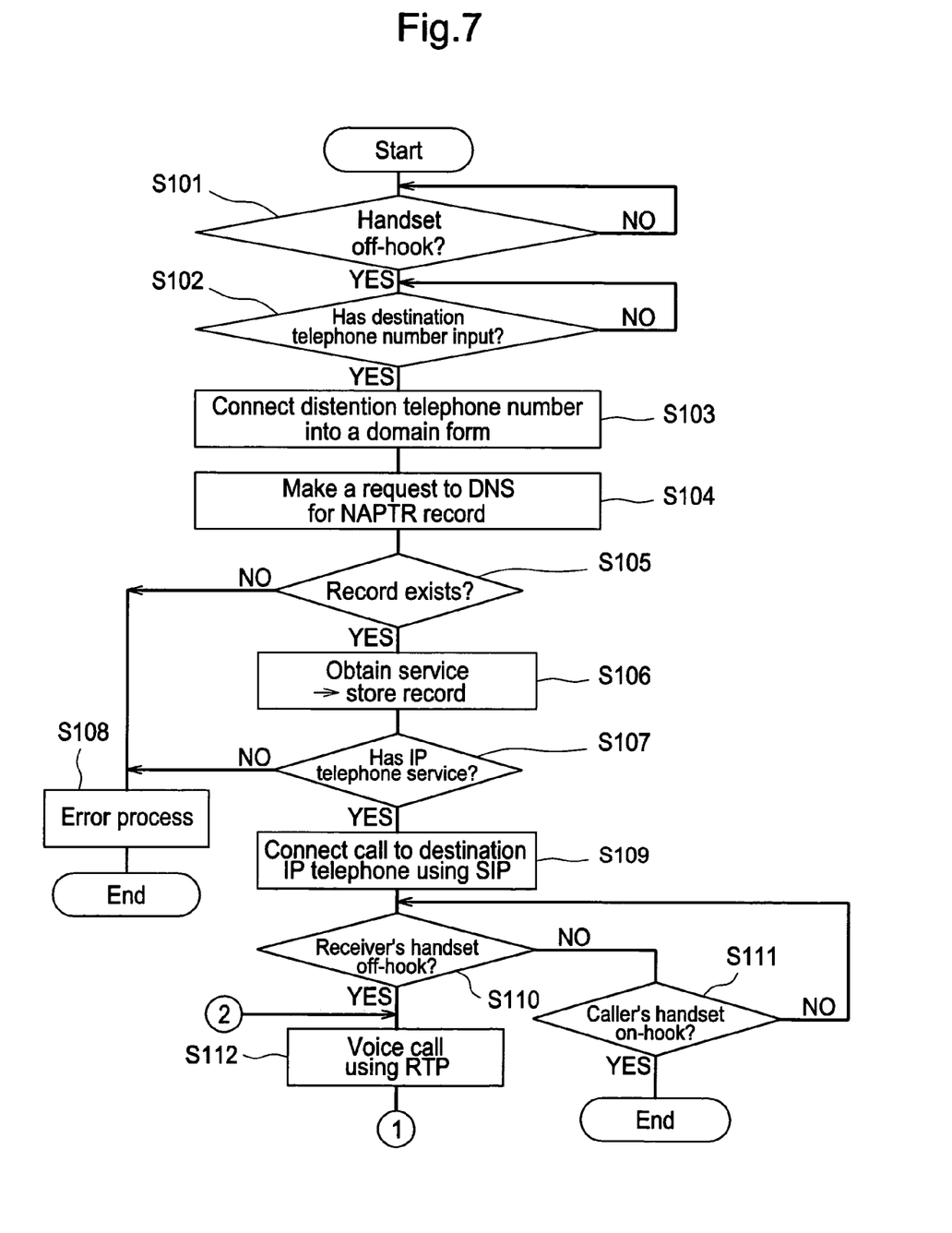
FIG. 7 is a flowchart illustrating the first half of a process for generating and executing a call at a caller terminal.
Figure 8:
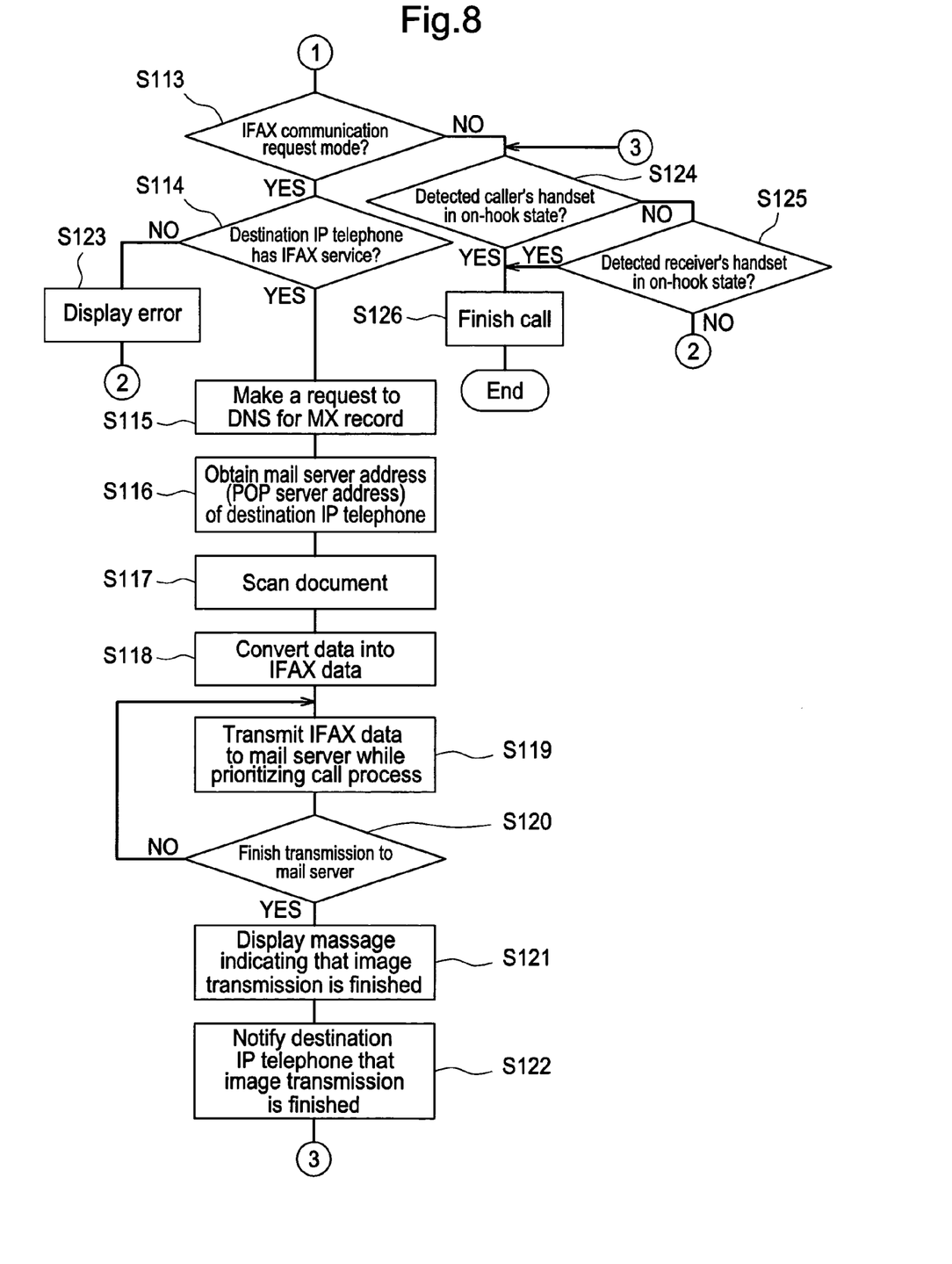
FIG. 8 is a flowchart illustrating the second half of the process generating and executing the call at the caller terminal.

FIGS. 7 and 8 are flowcharts illustrating a process at the caller terminal. The illustration uses IFAX IP telephone 100 as the caller terminal and IFAX IP telephone 110 as the receiver terminal, as shown in FIG. 2. When placing a call from the caller terminal, the user removes handset 17 from the body of the apparatus and inputs the telephone number of the receiver terminal from operation panel 12.

When the caller detects that handset 17 is in the off-hook state (S101) and recognizes that the telephone number is input (S102), the input telephone number is converted into a domain form so as to be searchable by the ENUM DNS (S103). For example, when the telephone number of the receiver terminal is "81-03-5434-5678", the domain-form telephone number is "8.7.6.5.4.3.4.5.3.1.8.e164.arpa". CPU 10 makes a request to DNS server 104 for a NAPTR resource record search using the domain-form telephone number as a key (S104). It is preferable that the address of DNS server 104 is pre-registered in the caller terminal.

DNS server 104 searches the database using the specified domain-form telephone number as the key. When the receiver terminal has already registered the service in the NAPTR resource record of DNS server 104, the corresponding NAPTR resource record is retrieved and transmitted to the requester (caller terminal).

Upon receiving the NAPTR resource record from DNS server 104, the caller terminal recognizes that the NAPTR resource record exists (S105). Therefore, the receiver terminal obtains the service information registered in the NAPTR resource record of DNS server 104, and stores the information in the work area of RAM 19 (S106). For example, when the receiver terminal has registered 4 NAPTR resource records as shown in FIG. 4, such record contents are stored.

On the other hand, when the NAPTR resource record of DNS server 104 is not registered, an error process is performed, indicating that the record does not exist (S108). For example, "error" may be displayed on operation panel 12.

Next, CPU 10 analyzes the obtained NAPTR resource record and determines whether the IP telephone service is registered (S107). In case of obtaining the NAPTR resource records shown in FIG. 4, for example, the first NAPTR resource record service contents (36) describes <sip>. Since <sip> indicates the IP telephone service, the caller terminal determines that the IP telephone service is available at the receiver terminal. Additionally, there are cases where it is possible to find out that the IP telephone service is available at the receiver terminal, during a process of exchanging information related to controlling a call in accordance with the SIP. When <sip> is not registered in service contents (36) in any of the obtained NAPTR resource records, it indicates that the receiver terminal does not have the IP telephone service. Therefore, the control moves to step S108 for an error process.

Next, the caller terminal establishes a call to the receiver terminal via SIP server 105 (S109). The call connecting process according to the SIP may include the following steps. The caller terminal first transmits an INVITE message to SIP server 105, the message including the information of the receiver terminal. The information about the receiver terminal included in the INVITE message can be obtained from the NAPTR resource record stored at step S106. When using the NAPTR resource record in FIG. 4, SIP URI (iptel@ifax2.abc.com) is used as the information of the receiver terminal, the information being described in the first NAPTR resource record that specifies the IP telephone service.

Upon receiving the INVITE message, SIP server 105 transmits the INVITE message to the receiver terminal, requesting a connection. The receiver terminal's SIP URI (iptel@ifax2.abc.com) is used as the destination for the INVITE message.

Upon receiving the INVITE message (requesting the connection), the receiver terminal returns a message, to the caller terminal, allowing the connection via SIP server 105. Upon receiving the message allowing the connection, the caller terminal transmits an ACK message to the receiver terminal via SIP server 105. Upon receiving the ACK message from the caller terminal, the receiver terminal returns "Ringing" (indicating a ringing status) to the caller terminal and transmits a sounding request to the handset.

Upon receiving "Ringing", the caller terminal sounds a ring tone from a speaker of handset 17. This ringing status continues until the receiver's handset is taken off the hook (S110), or the caller's handset 17 is put back on the hook (S111). When the caller's handset 17 is put back on the hook, it indicates that the user put handset 17 back to the apparatus. Therefore, the process is terminated.

When the user at the receiver terminal picks up handset 17 responding to the ringing phone to allow the operation at the terminal, the receiver terminal transmits an "OK" message to the caller terminal via SIP server 105, the message notifying that the voice call is now available. When the caller terminal returns an "ACK" message, the voice call is initiated.

When the caller and receiver terminals are connected, both terminals perform direct communication without SIP server 105 (S112). The exchange of voice data is performed by the UDP using the RTP. Voice data input from the microphone of handset 17 is compressed by voice compression/expansion unit 15. As shown in FIG. 5, CPU 10 transmits voice packets to Internet 103 via LAN 101, by inserting a task interruption every predetermined time period (e.g., every 20 msec). The IP header of the voice packet includes a sender IP address (caller terminal) and a destination IP address (receiver terminal). The RTP header sets time stamp information for controlling the order of the voice data.

When there is an image data transmission request from one user to another (between the caller and receiver terminals), the transmitting user presses the start button of operation panel 12 by setting a document in scanner 11. For example, the user of the caller terminal presses the start button for document transmission.

Upon detecting that the start button is pressed during the IP telephone call, CPU 10 at the caller terminal realizes an IFAX communication request has been made (S113). Upon detecting the IFAX communication request, CPU 10 determines, from the data stored in the NAPTR resource record (the obtained and stored at step S1106), whether the opposing terminal (receiver terminal), to which the voice call is connected, supports the IFAX function (whether the IFAX image communication is possible adhering to the recommendation), (S114). In other words, the caller terminal checks whether the receiver terminal includes the IFAX service in the NAPTR resource record (registered in the ENUM DNS). When the NAPTR resource records are obtained as shown in FIG. 4, <ifax> is written in the service contents in the second NAPTR resource record. <ifax> indicates that IFAX service is available. In this case, the caller terminal determines that the receiver terminal has the IFAX service.

Next, the caller terminal obtains the destination information of the receiver terminal, the information being e-mail delivery destination for the IFAX service. Accordingly, the caller terminal makes a request, to DNS server 104, for the Mx record by specifying the domain name of the receiver terminal (S115). The domain name of the receiver terminal is selected from the contents of the NAPTR resource record that is obtained and stored at step S106. Using the example shown in FIG. 4, the mail service is included in the second and fourth NAPTR resource code. Therefore, character codes after <mailto> (in the NAPTR resource code) can be used as a domain name.

DNS server 104 retrieves an MX record corresponding to the domain name (specified by the database) and transmits the record back to the calling terminal (requester).

Upon receiving the MX record from the receiver terminal via DNS server 104, the caller terminal stores the record in a predetermined address. Then, the mail server address specified by the receiver terminal is retrieved from the stored MX record (S116).

Next, scanner 11 is controlled to scan the document (S117), and the image data of the scanned document is converted into IFAX data (S118). Specifically, CPU 10 initiates the image compression program in order to compress the image data of the document in a predetermined format. Next, the compressed image data is converted into the FIFF format and then into the MIME format.

Although the above example of the conversion procedure adheres to one of the recommendations for IFAX, the present invention is not limited to the above procedure. Other formats (including an originally created format) can be used for generating the IFAX data as long as the receiver terminal can receive and expand the data as bit map.

Next, the IFAX data converted into the MIME format is grouped into packets. These packets are hereafter referred to as IFAX packets. As shown in FIG. 6, the IP header of the IFAX packet includes the IP address of mail server 106 obtained at step S116, as the destination IP address. While a UDP header is used for the voice packet, a TCP header is used for the IFAX packet. In particular, the IFAX packet is delivered by the TCP. Since the TCP retransmits a packet when the packet is lost during the transmission, the TCP can prevent deterioration of the image quality, due to a lacking part of the image data.

CPU 10 at the caller terminal delivers the IFAX data to mail server 106 of the receiver terminal, while prioritizing the voice call process (exchange of voice packets) (S119). In particular, as shown in FIG. 6, CPU 10 prioritizes the transmission of the voice packets by inserting a task interruption every predetermined time period. The IFAX packets are transmitted after one voice packet transmission and before another task interruption. Accordingly, IFAX packets are transmitted by utilizing the absent periods of voice packets, until all IFAX data is completely transmitted.

The above process allows voice data transmission (requiring real-time transmission) to be prioritized while IFAX data transmission (requiring less real-time, compared to voice data) is performed utilizing the absent periods of the voice data. Therefore, it is possible to transmit IFAX data to a receiver terminal while maintaining a voice call to the same terminal. The receiver terminal receives the e-mail data (IFAX data) from mail server 106 and displays the data on the display of operation panel 12, while maintaining the voice call (later described in detail).

When the IFAX data transmission to mail server 106 is completed (S120), the message indicating the completion of the image transmission is displayed on the display of operation panel 12 (S121). Further, in the present embodiment, the receiver terminal (voice call destination) is also notified regarding the completion of the image transmission (S122). A DTMF signal can be used as a signal for indicating the completion of the image transmission. However, the present invention is not limited to the DTMF signal as long as the opposing terminal of the voice call can recognize such a signal.

When determining that the IFAX service is not supported by the receiver terminal at step S114, an error message is displayed (S123). In addition, when the on-hook state is detected at handset 17 of the caller terminal (S124), or when the on-hook state is detected at handset 17 of the receiver terminal (S125), the call process is completed (S126).

Figure 9:
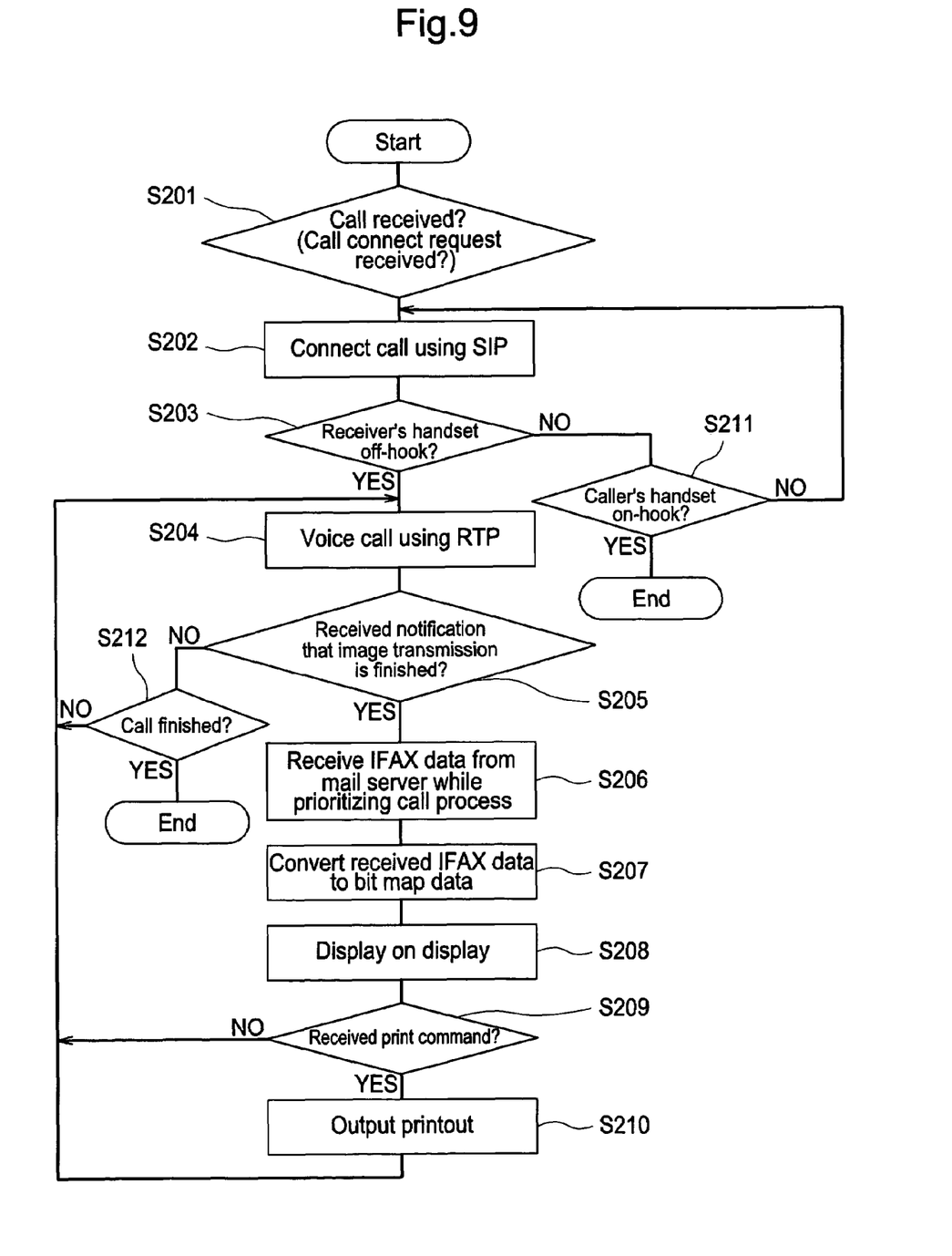
FIG. 9 is a flowchart illustrating a process for receiving and executing a call at a receiver terminal.

FIG. 9 is a flowchart illustrating the process at the receiver terminal. Upon receiving the INVITE message requesting the connection (S201), CPU 10 of the receiver terminal connects the call with the caller terminal via SIP server 105 according to the above described procedure (S202). When the user of the receiver terminal picks up handset 17 (S203), the RTP and UDP are employed for exchanging voice data (S204).

Upon receiving the image transmission completion notification (e.g., DTMF signal) during the voice call with the caller terminal (S205), the receiver terminal executes the process of receiving the e-mail (IFAX data) from mail server 106, while prioritizing the voice call process (S206). For example, in accordance with the POP3 protocol, e-mail data is received from mail server 106. The IFAX data included in the e-mail data is the IFAX data transmitted by the caller terminal at step S1119 of FIG. 8. In other words, after the caller terminal transmits the IFAX data as e-mail to mail server 106 of the receiver terminal, the receiver terminal downloads the received mail from mail server 106. Therefore, the e-mail data obtained by the receiver terminal from mail server 106 is the IFAX data transmitted by the caller terminal.

In this embodiment, the receiver terminal, upon detecting the DTMF signal, automatically receives the e-mail. However, the user at the receiver terminal can receive the e-mail from the mail server 106, by manually instructing the receiver terminal, when the user of the receiver terminal is notified that the IFAX data (transmitted by the caller terminal) is stored in mail server 106 of the receiver terminal. For example, the user of the receiver terminal can be notified by the voice of the user at the caller terminal during the voice call, about the IFAX data transmission.

Upon receiving the IFAX data from mail server 106, even during a voice call, the receiver terminal converts the IFAX data into a bit map data (S207), and display the bit map data on the display of the operation panel 12 (S208). In addition, when the user inputs a printer instruction, from operation panel 12, to print the image displayed on the display of operation panel 12 (S209), or when the automatic printing is set up by default, the bit map data is converted into a print data and print request is issued to printer 14. As a result, printer 14 prints out the received image (S210).

When the on-hook status is detected at handset 17 of the caller terminal at step S211, or when the on-hook status of handset 17 of the caller terminal or of the receiver terminal is detected at step S212, the voice call is terminated.

According to the present embodiment, the telephone number of the receiver terminal is used to retrieve the corresponding NAPTR resource record from the ENUM DNS, and a call is connected to the receiver terminal using the URI of the IP telephone service included in the NAPTR resource record. When an image needs to be transmitted to the receiver terminal during a voice call, the URI of the IFAX service included in the NAPTR resource record is used for image transmission. Therefore, it is possible to obtain the URI of the IFAX service of the destination and to transmit image data to the receiver terminal without interrupting the voice call.

Second Embodiment

Figure 10:
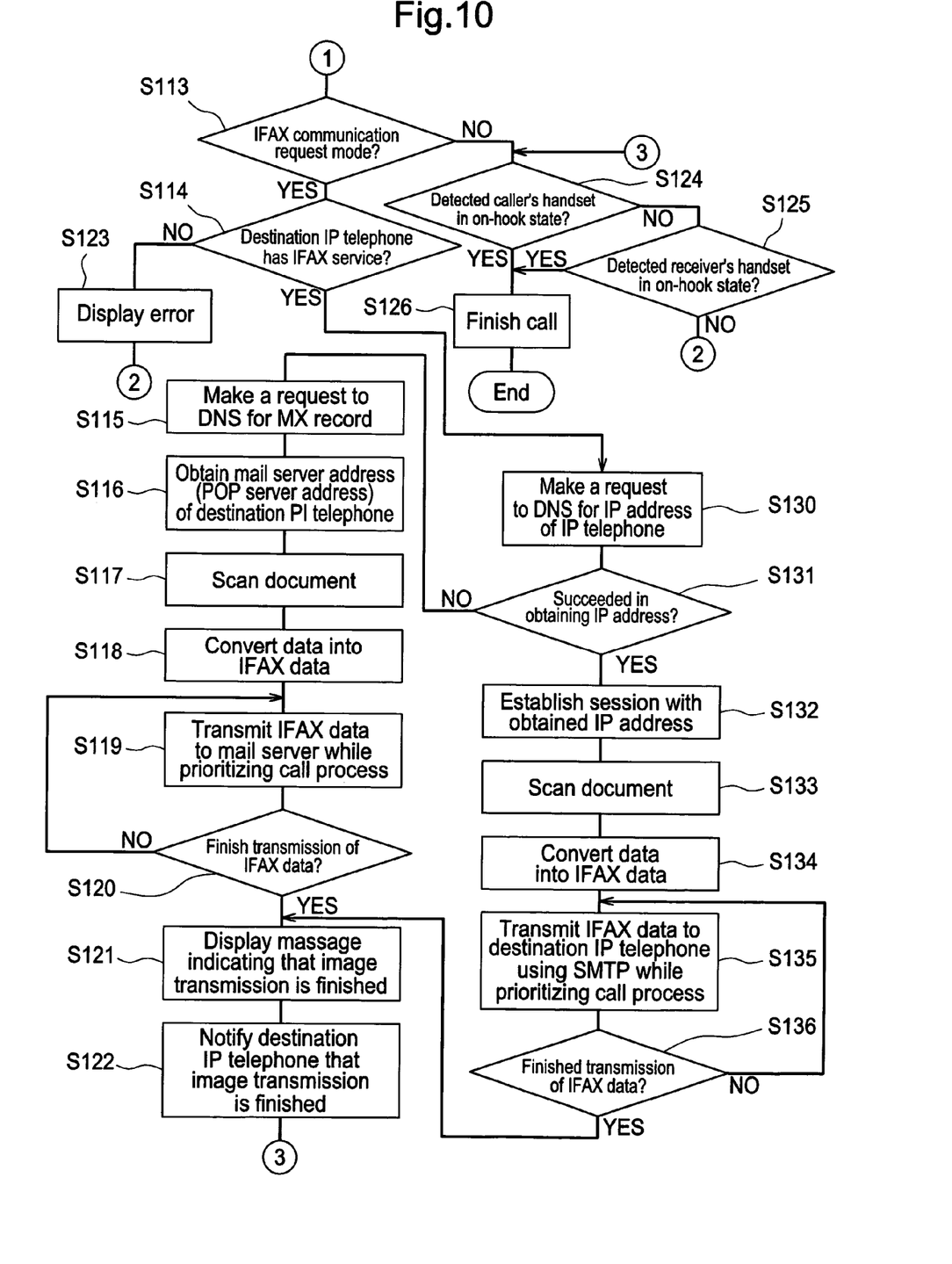
FIG. 10 is flowchart illustrating another variation of the process for generating and executing a call at the caller terminal.

Next, FIG. 10 is used to illustrate another embodiments of the present invention.

In the second embodiment, the IFAX data transmission is performed directly between the terminal using the SMTP. When the receiver terminal does not support the SMTP, the transmission is performed via a POP server. As the configuration of the hardware is the same as the first embodiment, the same numeral characters are used in the second embodiments.

The process from inputting the telephone number of the receiver terminal at the caller terminal, to starting the IFAX communication request, is the same as the process from step S101 to step S114 shown in FIGS. 7 and 8, in the first embodiment. When it is determined that the IFAX service is supported by the destination at step S114, the control moves to step S130 in order to make a request, to DNS server 104, for an IP address of the destination (the receiver terminal, in this example). Upon requesting an IP address of the object terminal from DNS server 104, the domain name of the object terminal is specified.

Then, DNS server 104 performs the search for the IP address of the specified object terminal, using the domain name of the object terminal. When information about the object terminal is registered in DNS server 104, the IP address is returned.

Upon receiving the IP address of the receiver terminal from DNS server 104 (S131), the caller terminal directly executes a TCP connection to the obtained IP address (receiver terminal) (S132). Then, the document is scanned by scanner 11 (S133), and the image data of the scanned document is converted to IFAX data (S134). By prioritizing the current voice call, the IFAX data is directly transmitted to the receiver terminal using the SMTP (S135). Similar to the previous described embodiment, the voice packet transmission is prioritized by inserting a task interruption every predetermined time period, and the IFAX packets are transmitted using the absent periods of the voice packets. At this time, the IP header of the IFAX packet includes the IP address of the receiver terminal itself (as the destination IP address) instead of the address of mail server 106.

When the IFAX data transmission is completed (S136), the control moves to step S121. The following process is the same as described above.

When the IP address of the destination terminal is not obtained due to the determination made at step S131, the control moves to step S115 to search for an MX record similar to the first embodiment, to switch the operation to image transmission via the mail server.

Accordingly, when the destination terminal supports the SMTP, the IFAX data can be transmitted directly to the destination terminal. Therefore, it is possible to eliminate the process of downloading data from POP to server and to shorten the time for displaying the image, thereby improving the real-time feature of this transmission. When the destination terminal does not support SMTP, it is possible to switch the transmission to via mail server 106.

In this example, the operation of the receiver terminal basically follows the flowchart shown in FIG. 9. However, at step S206, the receiver terminal directly receives e-mail including the IFAX data from the caller terminal using the SMTP, while prioritizing the voice call process.

In the above-described description, IFAX data transmission is used as an example. However, it is possible to transmit other files (e.g., image file) stored in removal memory 20 (external memory device), by converting the file into packets (similar to the example of IFAX packets) and by transmitting the data during the voice call. In particular, the caller terminal connects to DNS server 104, obtains the NAPTR resource record corresponding to the input telephone number, and connects the call to the receiver IP telephone using the URI of the IP telephone service included in the NAPTR resource record. Further, when transporting the file to the IP telephone during the voice call to the IP telephone, the destination IP address is obtained from the URI for the file transport service included in the NAPTR resource record. When transporting the file during the voice call, the data is captured from removal memory 20, the data transport packet (having the header including the obtained destination IP address) is generated, and the data transport packet for the file transport and the voice packet for the voice call are multiplexed. It is preferable that the voice packet transmission is prioritized and that the data transport packets are transmitted during the absent period of the voice packets.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

This application is based on the Japanese Patent Application No. 2004-100198 filed on Mar. 30, 2004, entire content of which is expressly incorporated by reference herein.

What is claimed is:

1. An IP telephone call method comprising:
   obtaining a resource record corresponding to an input telephone number by connecting to a DNS server;
   connecting a call to a receiver IP telephone using a URI for an IP telephone service, the URI being included in the resource record;
   obtaining a URI for an IFAX service from the resource record, when transmitting an image from a caller during a voice call to the receiver IP telephone;
   obtaining mail server information included in a URI for the IFAX service by connecting to the DNS server; and
   generating an image information packet having a mail server of the receiver IP telephone as a destination, when transmitting the image during the voice call, and multiplexing the image information packet and a voice packet for the voice call.

2. The IP telephone call method according to claim 1, wherein after the image information is transmitted to the mail server, a signal indicating completion of the transmission is transmitted to the receiver IP telephone.

3. An IP telephone call method comprising:
   obtaining a resource record corresponding to an input telephone number by connecting to a DNS server;
   connecting a call to a receiver IP telephone using a URI for an IP telephone service, the URI being included in the resource record;
   obtaining a URI for an IFAX service from the resource record, when transmitting an image from a caller IP telephone during a voice call to the receiver IP telephone;
   obtaining an IP address of the IP telephone from the URI for the IFAX service;
   directly establishing a session with the IP address of the receiver IP telephone; and
   generating an image information packet when transmitting an image during the voice call, the packet having the IP address of the receiver IP telephone as a destination, and directly transmitting, to the IP telephone, the image information packet according to the SMTP, while exchanging a voice packet for the voice call with the receiver IP telephone.

4. The IP telephone call method according to claim 3, further comprising:
   obtaining mail server information included in the URI for the IFAX service by connecting to the DNS server, when the IP address of the receiver IP telephone cannot be obtained, the IP address included in the URI for the IFAX telephone service; and generating an image information packet having a mail server of the receiver IP telephone as a destination, and multiplexing the image information packet for the image transmission and the voice packet for the voice call.

5. The IP telephone call method according to claim 1, wherein the voice packet transmission for the voice call is prioritized, and the image information packet is transmitted utilizing a gap between voice packets.

6. An IP telephone call method comprising:
obtaining a resource record corresponding to an input telephone number by connecting to a DNS server;
connecting a call to a receiver IP telephone using a URI for an IP telephone service, the URI being included in the resource record;
obtaining a destination IP address from a URI for a file transport service, the URI being included the resource record, when transporting a file to the IP telephone during a voice call to the IP telephone; and
generating a data transport packet having a header that includes the destination IP address, by retrieving data from an external memory device, when transporting the file during the voice call, and multiplexing the data transport packet for the file transport and a voice packet for the voice call.

7. The IP telephone call method according to claim 6, wherein the voice packet transmission for the voice call is prioritized, and the file transport packet is transmitted utilizing a gap between voice packets for the voice call.

8. An IP telephone call method, comprising:
connecting a call with a caller IP telephone via the Internet, in response to a request made by the caller IP telephone; and
retrieving an e-mail from a mail server of a receiver while prioritizing exchange of voice packets for a voice call, when detecting a signal indicating a completion of mail transmission from the caller IP telephone, during the voice call with the IP telephone.

9. An IP telephone comprising:
a memory that stores a program;
a processor unit that retrieves the program from said memory and executes the program;
a scanner that scans a document and generates image information;
a network controller that is connected to a network and controls an exchange of a packet;
a handset that performs input and output of voice data; and
an operation panel that is used at least for inputting a command for transmitting image information,
wherein, said processor unit obtains a resource record corresponding to an input telephone number by connecting to a DNS server;
connects a call to a receiver IP telephone using a URI for an IP telephone service, the URI being included in the resource record;
obtains a URI for an IFAX service from the resource record, when transmitting an image from a caller during a voice call to the receiver IP telephone;
obtains mail server information included in a URI for the IFAX service by connecting to the DNS server; and
generates an image information packet having a mail server of the receiver IP telephone as a destination, when transmitting the image during the voice call, and multiplexes the image information packet for the image transmission and a voice packet for the voice call.

10. An IP telephone comprising:
a memory that stores a program;
a processor unit that retrieves the program from said memory and executes the program;
a scanner that scans a document and generates image information;
a network controller that is connected to a network and controls an exchange of a packet;
a handset that performs input and output of voice data; and
an operation panel that is used at least for inputting a telephone number and a command for transmitting image information,
wherein, said processor unit obtains a resource record corresponding to an input telephone number by connecting to a DNS server;
connects a call to a receiver IP telephone using a URI for an IP telephone service, the URI being included in the resource record;
obtains a URI for an IFAX service from the resource record, when transmitting an image from a caller IP telephone during a voice call to the receiver IP telephone;
obtains an IP address of the IP telephone from the URI for the IFAX service;
directly establishes a session with the IP address of the receiver IP telephone; and
generates an image information packet when transmitting an image during the voice call, the packet having the IP address of the receiver IP telephone as a destination, and directly transmits, to the IP telephone, the image information packet according to the SMTP, while exchanging a voice packet for the voice call with the receiver IP telephone.

11. An IP telephone comprising:
a memory that stores a program;
a processor unit that retrieves the program from said memory and executes the program;
a scanner that scans a document and generates image information;
a network controller that is connected to a network and controls an exchange of a packet;
a handset that performs input and output of voice data; and
an operation panel that is used at least for inputting a telephone number and a command for transmitting image information,
wherein, said processor unit obtains a resource record corresponding to an input telephone number by connecting to a DNS server;
connects a call to a receiver IP telephone using a URI for an IP telephone service, the URI being included in the resource record;
obtains a destination IP address from a URI for a file transport service, the URI being included the resource record, when transporting a file to the IP telephone during a voice call to the IP telephone; and
generates a data transport packet having a header that includes the destination IP address, by retrieving data from an external memory device, when transporting the file during the voice call, and multiplexes the data transport packet for the file transport and a voice packet for the voice call.

* * * * *